(12) United States Patent
Oren et al.

(10) Patent No.: US 10,982,545 B2
(45) Date of Patent: Apr. 20, 2021

(54) ROTOR COUPLING RING

(71) Applicant: UNITED TECHNOLOGIES CORPORATION, Farmington, CT (US)

(72) Inventors: Nicholas Waters Oren, Marlborough, CT (US); Conway Chuong, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/392,912

(22) Filed: Apr. 24, 2019

(65) Prior Publication Data

US 2020/0340361 A1 Oct. 29, 2020

(51) Int. Cl.
*F01D 5/06* (2006.01)
*F02C 3/06* (2006.01)

(52) U.S. Cl.
CPC ............... *F01D 5/066* (2013.01); *F02C 3/06* (2013.01); *F05D 2230/60* (2013.01); *F05D 2240/24* (2013.01)

(58) Field of Classification Search
CPC ............... F01D 5/066; F01D 5/06; F02C 3/06
See application file for complete search history.

(56) References Cited

U.S. PATENT DOCUMENTS

| | | | | |
|---|---|---|---|---|
| 5,236,302 | A | * | 8/1993 | Weisgerber ........... F01D 11/001 415/173.7 |
| 6,588,298 | B2 | * | 7/2003 | Czerniak ................. F01D 5/027 416/145 |
| 9,109,450 | B2 | * | 8/2015 | Hummel ................. F01D 5/066 |
| 2013/0336785 | A1 | | 12/2013 | Hummel et al. |
| 2015/0369123 | A1 | | 12/2015 | Hanrahan |
| 2016/0237824 | A1 | * | 8/2016 | Himes ..................... F16F 15/34 |
| 2017/0184118 | A1 | | 6/2017 | Lueddecke et al. |
| 2017/0370224 | A1 | * | 12/2017 | Porter ................... F01D 11/006 |

FOREIGN PATENT DOCUMENTS

| | | |
|---|---|---|
| EP | 0921272 | 6/1999 |
| EP | 3266981 | 1/2018 |
| FR | 2949138 | 2/2011 |

OTHER PUBLICATIONS

European Patent Office, European Search Report dated Jun. 30, 2020 in Application No. 20171080.3.

* cited by examiner

*Primary Examiner* — Justin D Seabe
*Assistant Examiner* — Michael L Sehn
(74) *Attorney, Agent, or Firm* — Snell & Wilmer L.L.P.

(57) ABSTRACT

A rotor assembly is disclosed. In various embodiments, the rotor assembly includes a first rotor having a first plurality of tabs; a second rotor having a second plurality of tabs; and a rotor coupling ring having an anti-rotation tab configured for disposition between an adjacent pair of tabs from one of the first plurality of tabs or the second plurality of tabs.

17 Claims, 6 Drawing Sheets

ROTOR COUPLING RING

GOVERNMENT LICENSE RIGHTS

This invention was made with Government support awarded by the United States. The Government has certain rights in this invention.

FIELD

The present disclosure relates generally to gas turbine engines and, more particularly, components used to couple and decouple rotor disks within gas turbine engines.

BACKGROUND

Gas turbine engines typically include a fan section, a compressor section, a combustor section and a turbine section. During operation, air is pressurized in the compressor section and mixed with fuel and burned in the combustor section to generate hot combustion gases. The hot combustion gases are then communicated through the turbine section, where energy is extracted from the hot combustion gases to power the compressor section, the fan section and various other loads occurring within or proximate a gas turbine engine.

The turbine section of a gas turbine engine is typically coupled for rotation with the compressor section. Both the turbine section and the compressor section may include one or more stages of rotors that may be axially held together by one or more coupling elements such as, for example, sleeves, bolts or other types of fasteners. If the coupling elements become loose or break, one or more of the rotors may be free to move axially relative to the another, resulting in an over speed condition and potential damage to the engine.

SUMMARY

A rotor assembly is disclosed. In various embodiments, the rotor assembly includes a first rotor having a first plurality of tabs; a second rotor having a second plurality of tabs; and a rotor coupling ring having an anti-rotation tab configured for disposition between an adjacent pair of tabs from one of the first plurality of tabs or the second plurality of tabs.

In various embodiments, one or more of the first plurality of tabs includes a first tab base portion and a first tab free end portion and one or more of the second plurality of tabs includes a second tab base portion and a second tab free end portion configured to form a circumferential channel between the first rotor and the second rotor. In various embodiments, the rotor coupling ring is configured for disposition within the circumferential channel.

In various embodiments, the rotor coupling ring includes a first free end and a second free end. In various embodiments, the first free end of the rotor coupling ring is configured for positioning radially inward of and in contact with one or more of the first plurality of tabs or the second plurality of tabs. In various embodiments, the second free end of the rotor coupling ring is configured for positioning radially inward of and in contact with one or more of the first plurality of tabs or the second plurality of tabs. In various embodiments, the first free end defines a first hook and the second free end defines a second hook. In various embodiments, the rotor coupling ring includes a counterbalance portion. In various embodiments, the counterbalance portion is disposed substantially diametrically opposite the anti-rotation tab.

In various embodiments, at least one of the first rotor and the second rotor includes a first scallop configured to drain lubricant from the rotor assembly. In various embodiments, at least one of the first rotor and the second rotor includes a second scallop configured to drain lubricant from the rotor assembly. In various embodiments, the second scallop is disposed substantially diametrically opposite the first scallop. In various embodiments, at least one of the first rotor and the second rotor includes a third scallop and a fourth scallop configured to drain lubricant from the rotor assembly, the fourth scallop disposed substantially diametrically opposite the third scallop. In various embodiments, the first scallop is unobstructed in a radial direction by any of the first plurality of tabs and the second plurality of tabs.

A rotor coupling ring is disclosed. In various embodiments, the rotor coupling ring includes a split ring having a first free end and a second free end; an anti-rotation tab extending from a first ring location on the split ring and configured for disposition between an adjacent pair of tabs of a rotor; and a counterbalance portion extending along a circumferential segment of the split ring.

In various embodiments, the circumferential segment defines a midpoint positioned at a second ring location substantially diametrically opposite the first ring location. In various embodiments, the first free end includes a first hook projecting radially inward and the second free end includes a second hook projecting radially inward.

A method of coupling a first rotor to a second rotor is disclosed. In various embodiments, the method includes the steps of interlocking a first plurality of tabs of the first rotor with a second plurality of tabs of the second rotor; and locking the first plurality of tabs to the second plurality of tabs using a rotor coupling ring having an anti-rotation tab configured for disposition between an adjacent pair of tabs from either the first plurality of tabs or the second plurality of tabs and a counterbalance portion disposed substantially diametrically opposite the anti-rotation tab.

In various embodiments, the step of interlocking the first plurality of tabs of the first rotor with the second plurality of tabs of the second rotor includes establishing a circumferential channel that opens in a radially inward direction between the first plurality of tabs and the second plurality of tabs. In various embodiments, the step of locking the first plurality of tabs of the first rotor to the second plurality of tabs of the second rotor includes inserting the rotor coupling ring into the circumferential channel.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
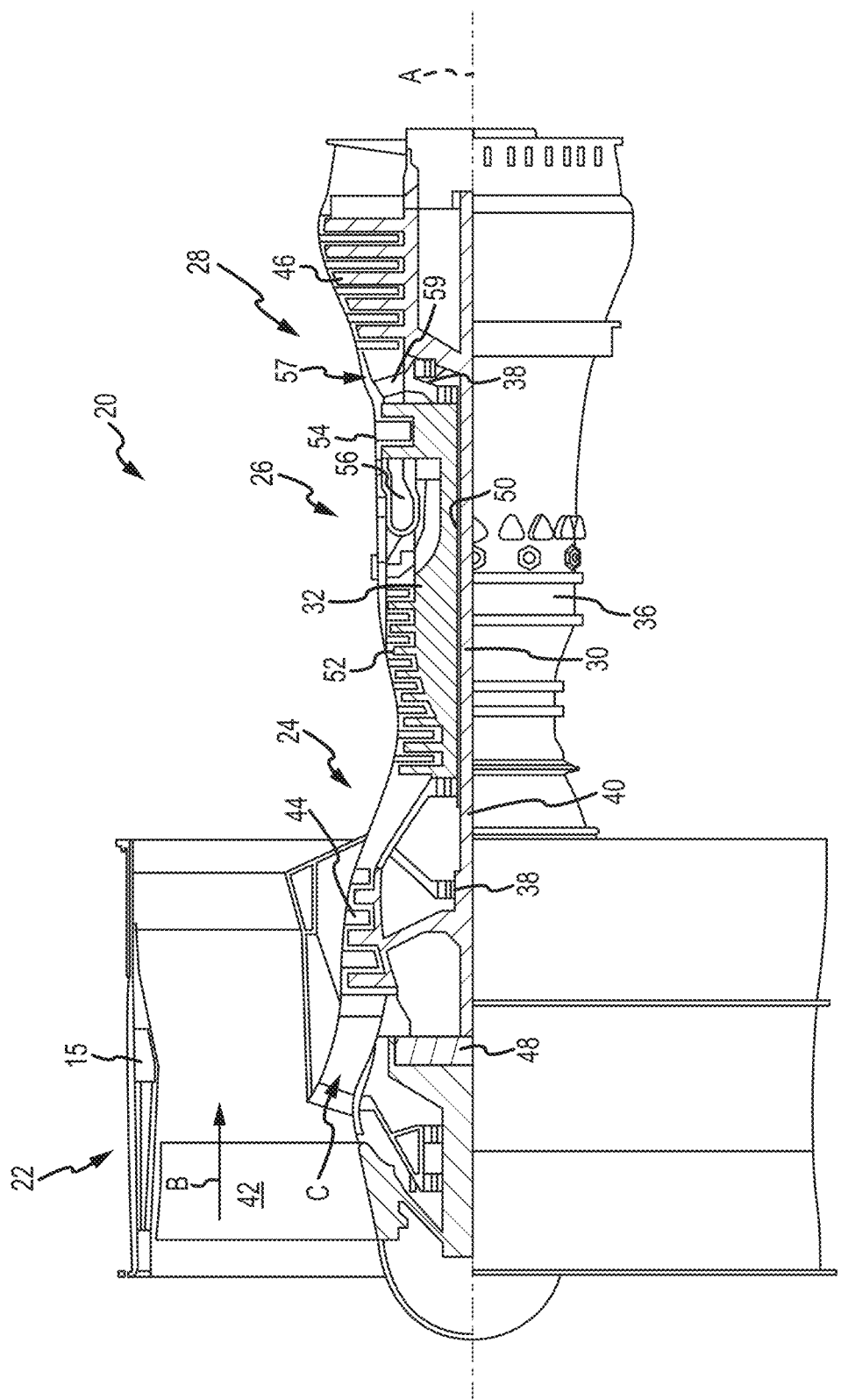
FIG. 1 is a schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core or primary flow path C for compression and communication into the combustor section 26 and then expansion through the turbine section 28. Although depicted as a two-spool turbofan gas turbine engine in the disclosed non-limiting embodiment, the concepts described herein are not limited to use with two-spool turbofans as the teachings may be applied to other types of turbine engines.

The gas turbine engine 20 generally includes a low speed spool 30 and a high speed spool 32 mounted for rotation about an engine central longitudinal axis A relative to an engine static structure 36 via several bearing systems 38. Various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low pressure compressor 44 and then the high pressure compressor 52, mixed and burned with fuel in the combustor 56, and then expanded over the high pressure turbine 54 and the low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 2A:
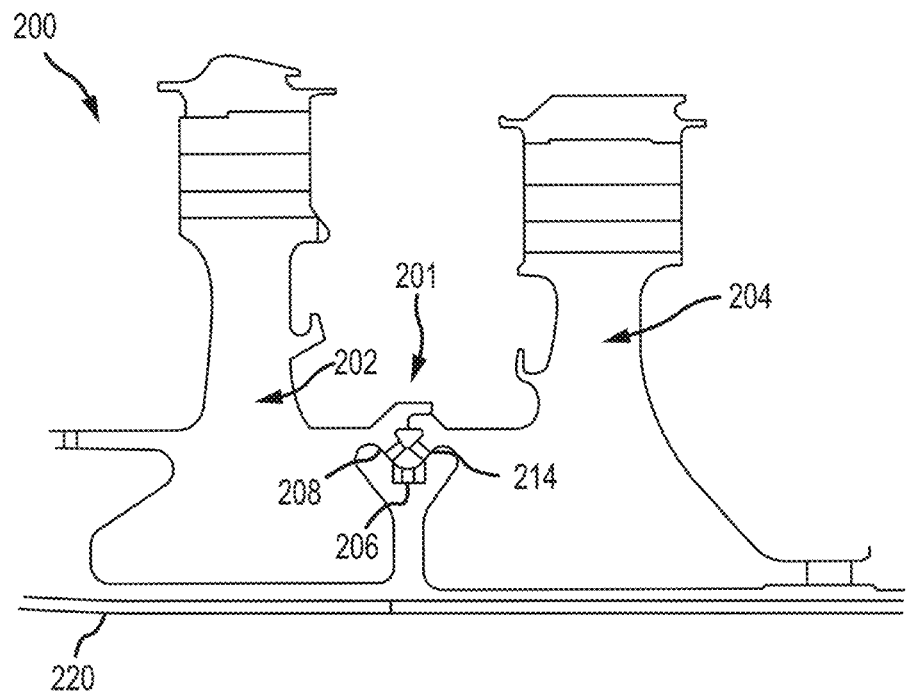
FIG. 2A is a schematic view of a first rotor, a second rotor and a locking mechanism coupling the first rotor and the second rotor to one another, in accordance with various embodiments.
Figure 2B:
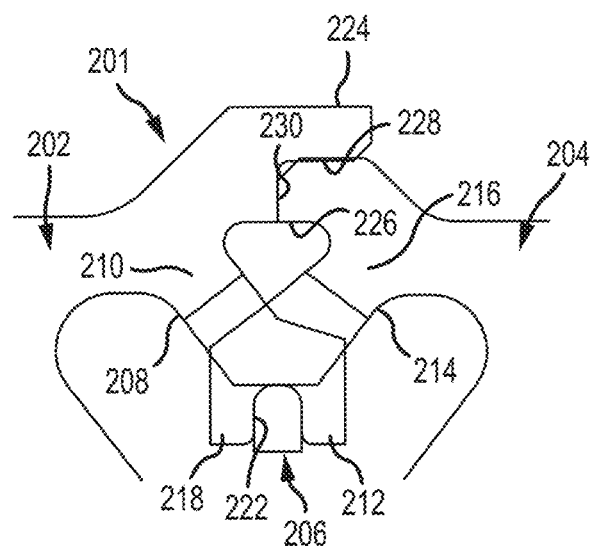
FIG. 2B is an expanded schematic view of the locking mechanism illustrated in FIG. 2A, in accordance with various embodiments.
Figure 2C:
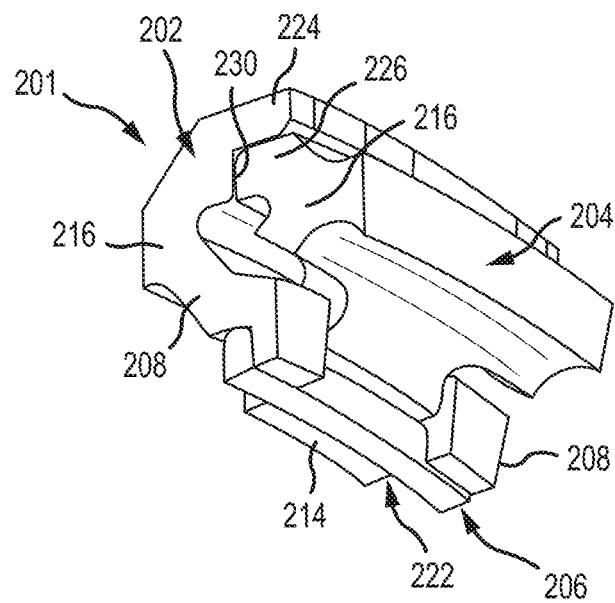
FIG. 2C is an expanded perspective schematic view of the locking mechanism illustrated in FIG. 2A, in accordance with various embodiments.
Figure 2D:
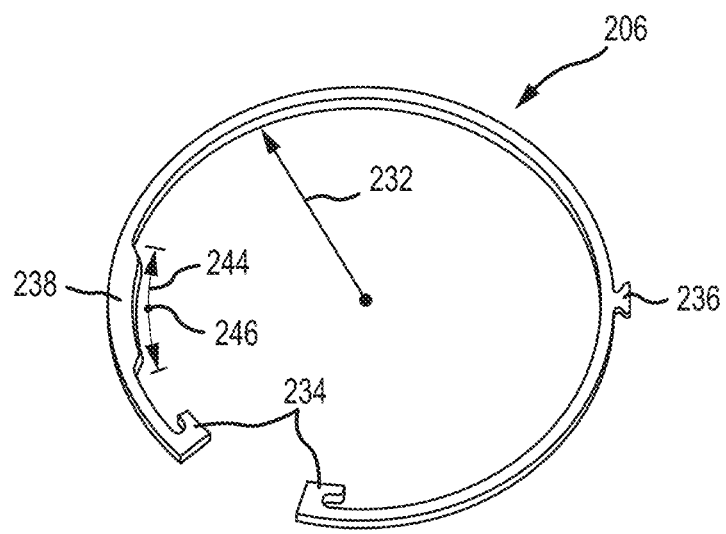
FIG. 2D is a perspective schematic view of a rotor coupling ring illustrated in FIG. 2A, in accordance with various embodiments.
Figure 2E:
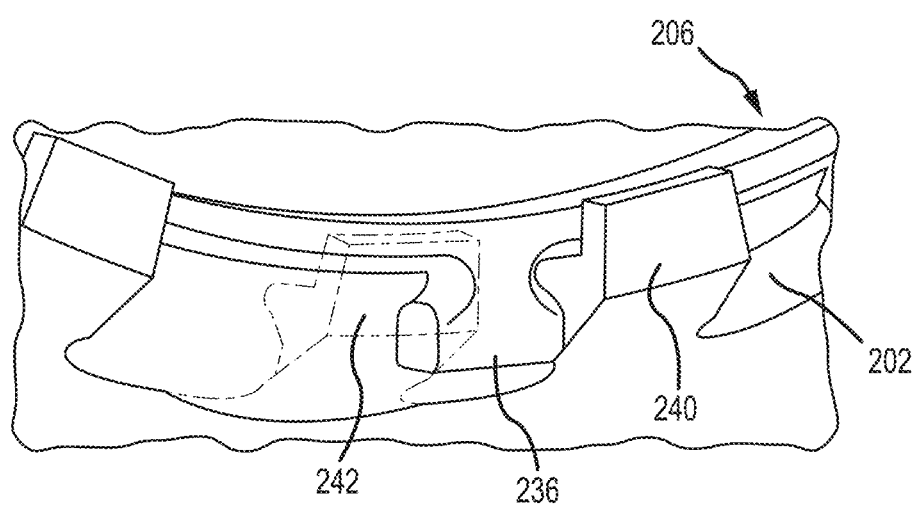
FIG. 2E is an expanded perspective schematic view of the rotor coupling ring illustrated in FIG. 2A, disposed adjacent a first rotor, in accordance with various embodiments.

Referring now to FIGS. 2A, 2B, 2C, 2D and 2E, various illustrations of a rotor assembly 200 having a locking mechanism 201 coupling a first rotor 202 to a second rotor 204 are provided, in accordance with various embodiments. Referring to FIG. 2A, for example, a schematic view of the first rotor 202, the second rotor 204 and the locking mechanism 201, coupling the first rotor 202 to the second rotor 204, is provided. FIGS. 2B and 2C provide expanded side and perspective views of the locking mechanism 201. FIG. 2D provides a perspective view of a rotor coupling ring 206 configured to couple the first rotor 202 to the second rotor 204, while FIG. 2E provides an expanded perspective view of the rotor coupling ring 206 disposed adjacent the first rotor 202.

Referring generally to each of FIGS. 2A-2E, the first rotor 202 includes a first tab 208 having a first tab base portion 210 and a first tab free end portion 212. Similarly, the second rotor 204 includes a second tab 214 having a second tab base portion 216 and a second tab free end portion 218. In general, the first rotor 202 includes a plurality of first tabs, including the first tab 208, each having a first tab base portion 210 and a first tab free end portion 212. Likewise, the second rotor 204 includes a plurality of second tabs, including the second tab 214, each having a second tab base portion 216 and a second tab free end portion 218. In general, each of the plurality of first tabs is spaced circumferentially from adjacent ones of the plurality of first tabs, while each of the plurality of second tabs is spaced circumferentially from adjacent ones of the plurality of second tabs. Further, each of the plurality of first tabs and each of the plurality of second tabs extend axially toward one another and radially inward. So configured, the first plurality of tabs and the second plurality of tabs circumferentially interlock with each other, enabling the first rotor 202 and the second rotor 204 to rotate in unison when the first rotor 202 and the second rotor 204 are assembled into coaxial arrangement. In various embodiments, a tie rod 220 is used to axially maintain and couple the first rotor 202 and the second rotor 204 to one of a compressor section or a turbine section, depending, respectively, on whether the first rotor 202 and the second rotor 204 are components of a turbine section or a compressor section.

When the first rotor 202 and the second rotor 204 are interlocked, the first plurality of tabs and the second plurality of tabs define a circumferential channel 222. The rotor coupling ring 206 is disposed within the circumferential channel 222 to lock the first plurality of tabs and the second plurality of tabs together. Thus, the first rotor 202 and the second rotor 204 are coupled together for co-rotation through the locking mechanism 201. In other words, the interlocking of the first plurality of tabs and the second plurality of tabs circumferentially and rotationally lock the first rotor 202 and the second rotor 204 together. The rotor coupling ring 206, disposed within the circumferential channel 222 defined by the first plurality of tabs and the second plurality of tabs, rotationally and axially couple the rotors together, thereby preventing or limiting relative axial movement between the first rotor 202 and the second rotor 204. The rotational and axial coupling of the first rotor 202 and the second rotor 204 ensures the second rotor 204 will tend not to axially disengage from the first rotor 202 in the case that the connection provided by the tie rod 220 is lost.

To further facilitate coupling of the first rotor 202 and the second rotor 204, the first rotor 202 includes a first axial projection 224 and the second rotor 204 includes a second axial projection 226. The first axial projection 224 and the second axial projection 226 overlap in a radial direction and bear against one another at a radial bearing surface 228. An axial bearing surface 230 reacts against axial loads between the first rotor 202 and the second rotor 204 and provides an axial stop during assembly of the first rotor 202 and the second rotor 204. In operation, friction at the radial bearing surface 228 and the axial bearing surface 230 limits relative rotational and axial movement between the first rotor 202 and the second rotor 204.

Referring now to FIG. 2D, an isolated full view of the rotor coupling ring 206 is provided. In various embodiments, the rotor coupling ring 206 is a split ring, which is also considered to be a positive engagement member. As illustrated, the split ring defines a first free end and a second free end which, in various embodiments, may be defined by radially inwardly projecting hooks 234. In the uncompressed state shown in FIG. 2D, the rotor coupling ring 206 defines a radius 232 that is diametrically larger than a radius of the circumferential channel 222 defined by the first plurality of tabs and the second plurality of tabs. To assemble the rotor coupling ring 206 into the circumferential channel 222, the rotor coupling ring is compressed using the radially inwardly projecting hooks 234. The rotor coupling ring 206 is compressed to a size that is diametrically smaller than the circumferential channel 222. The rotor coupling ring 206, while in the compressed state, is then inserted into the circumferential channel 222 and released such that the rotor coupling ring 206 expands into the circumferential channel 222. Since the rotor coupling ring 206 is diametrically larger than the circumferential channel 222, the rotor coupling ring 206 exerts a positive force in a radially outward direction, thus ensuring that the rotor coupling ring 206 remains within the circumferential channel 222 to lock the first plurality of tabs and the second plurality of tabs together. Similarly, the radially inwardly projecting hooks 234 may also be used to remove the rotor coupling ring 206 from the circumferential channel 222 for maintenance or the like.

Referring to FIGS. 2D and 2E, the rotor coupling ring 206 includes an anti-rotation tab 236 disposed at a first ring location and configured for disposition between an adjacent pair or tabs, such as, for example, a first tab 240 and a second tab 242 among the first plurality of tabs. In various embodiments, the anti-rotation tab 236 may be similarly configured for disposition between an adjacent pair of tabs from among the second plurality of tabs. The anti-rotation tab 236, disposed between an adjacent pair of tabs, such as, for example, the first tab 240 and the second tab 242, prevents the rotor coupling ring 206 from rotating with respect to the first rotor 202 and the second rotor 204. A counterbalance portion 238 of the rotor coupling ring 206 provides added mass to the rotor coupling ring 206 to offset the added mass of the anti-rotation tab 236. In various embodiments, the counterbalance portion 238 extends along a circumferential segment 244 of the rotor coupling ring 206 and provides an additional mass equal to the mass of the anti-rotation tab 236. In various embodiments, a circumferential midpoint 246 of the counterbalance portion 238 is disposed at a second ring location diametrically opposite (or substantially diametrically opposite, e.g., within ±fifteen degrees (15°) of being diametrically opposite) the location of the anti-rotation tab 236 on the rotor coupling ring 206.

Figure 3:
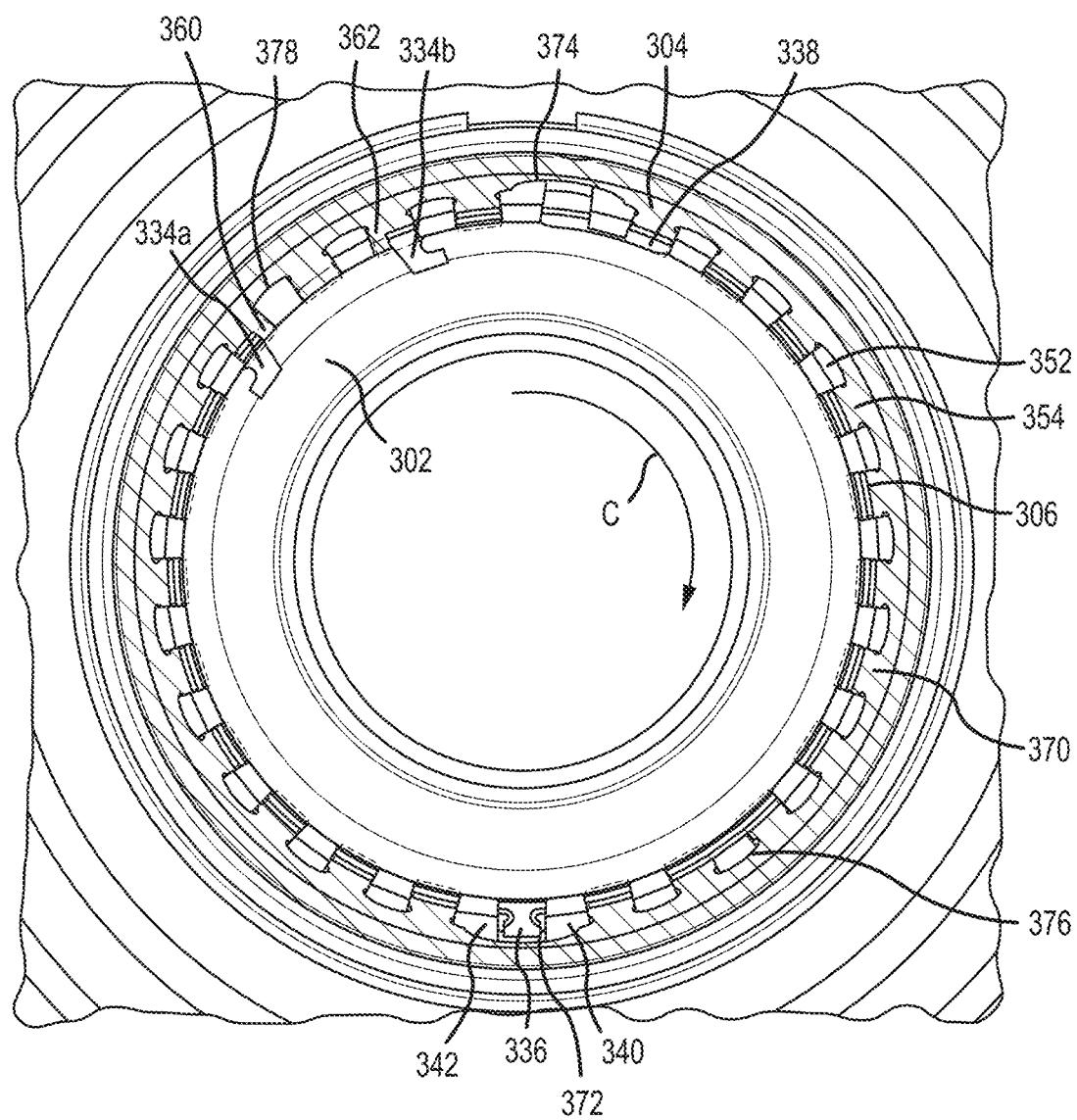
FIG. 3 is an axial schematic view of a rotor coupling ring disposed between a first rotor and a second rotor, in accordance with various embodiments.

Referring now to FIG. 3, a schematic view of a rotor coupling ring 306 is illustrated disposed between a first rotor 302 and a second rotor 304. In various embodiments, the first rotor 302 includes a first plurality of tabs 352 and the second rotor 304 includes a second plurality of tabs 354. In various embodiments, each tab of the first plurality of tabs 352 is similar in shape to the first tab 208 described above with reference to FIGS. 2B and 2C. Likewise, each tab of the second plurality of tabs 354 is similar in shape to the second tab 214 described above with reference to FIGS. 2B and 2C. The rotor coupling ring 306 includes a first hook 334a and a second hook 334b, each of which projects radially inward, similar to the radially inwardly projecting hooks 234 described above with reference to FIG. 2D. The rotor coupling ring 306 also includes an anti-rotation tab 336 and a counterbalance portion 338, similar to the anti-rotation tab 236 and the counterbalance portion 238 described above with reference to FIG. 2D.

In various embodiments, the anti-rotation tab 336 is configured for disposition, when assembled, between a first tab 340 and a second tab 342 of the first rotor 302, similar to the first tab 240 and the second tab 242 of the first rotor 202 described above with reference to FIG. 2E. Further, when assembled, the first hook 334a is configured for disposition radially inward of and in contact with a first tab 360 of the second rotor 304, while the second hook 334b is configured for disposition radially inward of and in contact with a second tab 362 of the second rotor 304. Positioning the first hook 334a radially inward of and in contact with the first tab 360 and the second hook radially inward of and in contact with the second tab 362 prevents the free ends of the rotor coupling ring 306 (e.g., the first hook 334a and the second hook 334b) from becoming unsupported in the radial direction. The anti-rotation tab 336, further, prevents the rotor coupling ring 306 from rotating, thereby ensuring the first hook 334a and the second hook 334b, respectively, remain radially inward of and in contact with the first tab 360 and the second tab 362.

In various embodiments, a lubricant draining feature is incorporated into one or both of the first rotor 302 and the second rotor 304. For example, in various embodiments, the second rotor 304 includes one or more scallops or orifices that extend through a circumferential wall 370 of the second rotor 304. The one or more scallops may include, for example, a first scallop 372 disposed in a first location and a second scallop 374 disposed diametrically opposite the first scallop 372. In various embodiments, the scallops may include a third scallop 376 circumferentially offset from the first scallop 372 and a fourth scallop 378 disposed diametrically opposite the third scallop 376. In practice, and number of additional scallops may be incorporated into and extend through one or more of the first rotor 302 and the second rotor 304 to facilitate draining of the lubricant radially outward due to centrifugal force as the assembly of the first rotor 302 and the second rotor 304 rotate during operation. In various embodiments, one or more tabs from the first plurality of tabs 352 that correspond with the one or more scallops may be eliminated to facilitate draining the lubricant (e.g., at least one of the one or more scallops is unobstructed or substantially unobstructed in a radial direction by any of the first plurality of tabs and the second plurality of tabs). For example, as illustrated in FIG. 3, the tabs from the first plurality of tabs 352 corresponding with the third scallop 376 and the fourth scallop 378 are eliminated. In various embodiments, the tab corresponding to the second scallop 374 may also be eliminated.

As further illustrated in FIG. 3, in various embodiments, the first scallop 372 may be positioned at approximately one-hundred eighty degrees (180°) in a circumferential direction C, while the second scallop 374 is positioned at approximately zero degrees (0°). Similarly, in various embodiments, the third scallop 376 may be positioned at approximately one-hundred forty-five degrees (145°) in the circumferential direction C, while the fourth scallop 378 is positioned at approximately three-hundred twenty-five degrees (325°). In general, the scallops may be positioned at other locations, such as, for example, in ninety degree (90°) increments about the circumferential direction C. Further, while the pairs of scallops illustrated in FIG. 3 are positioned substantially diametrically opposite one another (e.g., within ±fifteen degrees (15°) of being diametrically opposite), the disclosure contemplates various embodiments where pairs of scallops are not positioned diametrically opposite one another. In addition, while four scallops are illustrated in FIG. 3, the disclosure contemplates any number of scallops or pairs of scallop, such as, for example, a single scallop positioned at zero degrees (0°) or a single pair of scallops positioned at zero degrees (0°) and one-hundred eighty degrees (180°).

Figure 4:
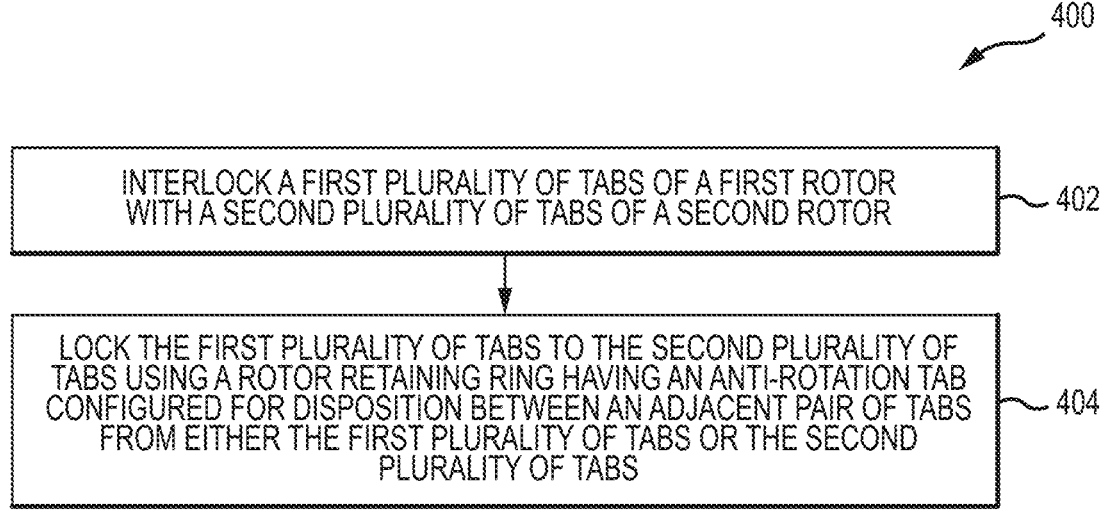
FIG. 4 describes a method of coupling a first rotor to a second rotor, in accordance with various embodiments.

Referring now to FIG. 4, a method 400 of coupling a first rotor to a second rotor is described. In various embodiments, a first step 402 includes interlocking a first plurality of tabs of the first rotor with a second plurality of tabs of the second rotor. A second step 404 includes locking the first plurality of tabs to the second plurality of tabs using a rotor retaining ring having an anti-rotation tab configured for disposition between an adjacent pair of tabs from either the first plurality of tabs or the second plurality of tabs. In various embodiments, the step of interlocking the first plurality of tabs with the second plurality of tabs includes establishing a circumferential channel that opens in a radially inward direction between the first plurality of tabs and the second plurality of tabs. In various embodiments, the step of locking the first plurality of tabs to the second plurality of tabs includes inserting the rotor coupling ring into the circumferential channel.

The foregoing disclosure provides an apparatus and method to couple a first rotor to a second rotor. The coupling, including two pluralities of tabs locked together by a rotor retaining ring, is configured to transfer torque between the first rotor and the second rotor and to provide axial retention during assembly and disassembly and during instances of tie shaft failure. An anti-rotation tab is included on the rotor coupling ring to prevent the ring from rotating with respect to the first rotor and the second rotor, thereby ensuring the free ends of the ring remain supported in the radial direction at all times during operation. The anti-rotation tab also enables mistake-proof assembly of the coupling by ensuring the free ends of the rotor coupling ring, when assembled, are properly positioned within the circumferential channel and remain in contact with tabs that are positioned radially outward of the free ends. While the disclosure focuses on rotors having pluralities of tabs—e.g., a handshake coupling configuration—the anti-rotation feature of the rotor coupling ring may be incorporated into other rotor locking mechanisms having features (e.g., protrusions or tabs) configured to prevent a rotor coupling ring from rotating with respect to the rotors, whether or not the rotors include pluralities of tabs configured to interlock the rotors together. Additional applications of the anti-rotation feature described in the disclosure might include, for example, balance rings, instrumentation egress or other applications where anti-rotation of a split ring is either beneficial or required. Further, while the disclosure provides an apparatus to facilitate draining of a lubricant from the assembled combination of rotors, the disclosure contemplates the rotor coupling ring as being applicable to various embodiments where the draining of lubricant is not required or provided for.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A rotor assembly, comprising:
   a first rotor having a first plurality of tabs;
   a second rotor having a second plurality of tabs, the second rotor coupled to the first rotor via the first plurality of tabs and the second plurality of tabs; and
   a rotor coupling ring having an anti-rotation tab configured for disposition between an adjacent pair of tabs from one of the first plurality of tabs or the second plurality of tabs,
   wherein the first rotor includes a first scallop positioned at a first circumferential location in a circumferential direction about the rotor assembly,
   wherein the second rotor includes a first open space, in place of a first tab of the second plurality of tabs, at the first circumferential location and
   wherein the anti-rotation tab is positioned within the first open space and between a first tab and a second tab of the first plurality of tabs.

2. The rotor assembly of claim 1, wherein one or more tabs of the first plurality of tabs includes a first tab base portion and a first tab free end portion and one or more tabs of the second plurality of tabs includes a second tab base portion and a second tab free end portion configured to form a circumferential channel between the first rotor and the second rotor.

3. The rotor assembly of claim 2, wherein the rotor coupling ring is configured for disposition within the circumferential channel.

4. The rotor assembly of claim 3, wherein the rotor coupling ring includes a first free end and a second free end.

5. The rotor assembly of claim 4, wherein the first free end of the rotor coupling ring is configured for positioning radially inward of and in contact with one or more tabs of the first plurality of tabs or the second plurality of tabs.

6. The rotor assembly of claim 5, wherein the second free end of the rotor coupling ring is configured for positioning radially inward of and in contact with one or more tabs of the first plurality of tabs or the second plurality of tabs.

7. The rotor assembly of claim 6, wherein the first free end defines a first hook and the second free end defines a second hook.

8. The rotor assembly of claim 7, wherein the rotor coupling ring includes a counterbalance portion.

9. The rotor assembly of claim 8, wherein the counterbalance portion is disposed substantially diametrically opposite the anti-rotation tab.

10. The rotor assembly of claim 1, wherein the first scallop is configured to drain lubricant from the rotor assembly.

11. The rotor assembly of claim 10, wherein the first rotor includes a second scallop configured to drain lubricant from the rotor assembly.

12. The rotor assembly of claim 11, wherein the second scallop is disposed substantially diametrically opposite the first scallop at a second circumferential location and wherein the second rotor includes a second open space, in place of a second tab of the second plurality of tabs, at the second circumferential location.

13. The rotor assembly of claim 12, wherein the first rotor includes a third scallop and a fourth scallop configured to drain lubricant from the rotor assembly, the fourth scallop disposed substantially diametrically opposite the third scallop.

14. The rotor assembly of claim 11, wherein the first scallop and the second scallop are unobstructed in a radial direction by any tab of the second plurality of tabs.

15. A method of coupling a first rotor to a second rotor to form a rotor assembly, comprising:
    interlocking a first plurality of tabs of the first rotor with a second plurality of tabs of the second rotor; and
    locking the first plurality of tabs to the second plurality of tabs using a rotor coupling ring having an anti-rotation tab configured for disposition between an adjacent pair of tabs from the first plurality of tabs and a counterbalance portion disposed substantially diametrically opposite the anti-rotation tab,
    wherein the first rotor includes a first scallop positioned at a circumferential location in a circumferential direction about the rotor assembly,
    wherein the second rotor includes an open space, in place of a tab of the second plurality of tabs, at the circumferential location and
    wherein the anti-rotation tab is positioned within the open space and between a first tab and a second tab of the first plurality of tabs.

16. The method of claim 15, wherein interlocking the first plurality of tabs of the first rotor with the second plurality of tabs of the second rotor includes establishing a circumferential channel that opens in a radially inward direction between the first plurality of tabs and the second plurality of tabs.

17. The method of claim 16, wherein locking the first plurality of tabs of the first rotor to the second plurality of tabs of the second rotor includes inserting the rotor coupling ring into the circumferential channel.

* * * * *